United States Patent

Gondo et al.

(10) Patent No.: US 10,298,651 B2
(45) Date of Patent: May 21, 2019

(54) ENCODING DEVICE, DECODING DEVICE, COMPUTER PROGRAM PRODUCT, AND STREAMING SYSTEM

(71) Applicant: KABUSHIKI KAISHA TOSHIBA, Minato-ku (JP)

(72) Inventors: Shunichi Gondo, Ota (JP); Takeshi Chujoh, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 111 days.

(21) Appl. No.: 15/259,485

(22) Filed: Sep. 8, 2016

(65) Prior Publication Data

US 2017/0078355 A1 Mar. 16, 2017

(30) Foreign Application Priority Data

Sep. 16, 2015 (JP) .................... 2015-183319

(51) Int. Cl.
| | | |
|---|---|---|
| *G06F 15/16* | (2006.01) | |
| *H04L 29/06* | (2006.01) | |
| *H04N 21/2343* | (2011.01) | |
| *H04N 21/81* | (2011.01) | |
| *H04N 19/30* | (2014.01) | |

(52) U.S. Cl.
CPC .......... *H04L 65/607* (2013.01); *H04L 65/602* (2013.01); *H04L 65/80* (2013.01); *H04N 19/30* (2014.11); *H04N 21/234327* (2013.01); *H04N 21/816* (2013.01)

(58) Field of Classification Search
CPC ..... H04L 65/607; H04L 65/80; H04L 65/602; H04N 19/30; H04N 21/4327; H04N 21/816

USPC ........................................................ 709/217
See application file for complete search history.

(56) References Cited

U.S. PATENT DOCUMENTS

| | | | | |
|---|---|---|---|---|
| 6,879,634 B1 * | 4/2005 | Oz | ................. | H04L 29/06 375/240.25 |
| 7,853,981 B2 | 12/2010 | Seo | | |
| 8,345,983 B2 | 1/2013 | Noguchi et al. | | |
| 8,503,804 B2 * | 8/2013 | Suzuki | .................... | G06T 9/007 382/233 |
| 8,633,966 B2 * | 1/2014 | Kato | ................ | G11B 20/10527 348/42 |

(Continued)

FOREIGN PATENT DOCUMENTS

| | | |
|---|---|---|
| JP | 2005-110244 A | 4/2005 |
| JP | 2006-237656 A | 9/2006 |

(Continued)

*Primary Examiner* — Kristie D Shingles
(74) *Attorney, Agent, or Firm* — Oblon, McClelland, Maier & Neustadt, L.L.P.

(57) ABSTRACT

According to an embodiment, an encoding device includes a storage controller, a difference generator, and a communication controller. The storage controller is configured to store a base stream in a storage. The base stream serves as basis for encoding and decoding and is shared with a decoding device. The difference generator is configured to generate a difference bit stream that represents difference between an input bit stream that has been input and the base stream. The communication controller is configured to control a communicating unit to transmit the difference bit stream.

8 Claims, 11 Drawing Sheets

(56) References Cited

U.S. PATENT DOCUMENTS

| | | | |
|---|---|---|---|
| 9,036,930 B2* | 5/2015 | Suzuki | G06T 9/007 |
| | | | 382/233 |
| 9,185,423 B2* | 11/2015 | Shand | H04N 19/647 |
| 9,426,480 B2* | 8/2016 | Suzuki | G06T 9/007 |
| 9,571,815 B2* | 2/2017 | Yang | H04N 13/0022 |
| 2005/0129130 A1* | 6/2005 | Shen | H04N 1/646 |
| | | | 375/240.24 |
| 2006/0171463 A1 | 8/2006 | Hanamura et al. | |
| 2011/0064322 A1* | 3/2011 | Suzuki | G06T 9/007 |
| | | | 382/232 |
| 2016/0142715 A1 | 5/2016 | Tanizawa et al. | |

FOREIGN PATENT DOCUMENTS

| | | |
|---|---|---|
| JP | 2009-49979 A | 3/2009 |
| JP | 2010-011154 A | 1/2010 |
| JP | 2016-96502 A | 5/2016 |

\* cited by examiner

ENCODING DEVICE, DECODING DEVICE, COMPUTER PROGRAM PRODUCT, AND STREAMING SYSTEM

CROSS-REFERENCE TO RELATED APPLICATION

This application is based upon and claims the benefit of priority from Japanese Patent Application No. 2015-183319, filed on Sep. 16, 2015; the entire contents of which are incorporated herein by reference.

FIELD

Embodiments described herein relate generally to an encoding device, a decoding device, a computer program product, and a streaming system.

BACKGROUND

In the present day, the SHVC encoding technology (scalable expansion of HEVC) is known that enables expansion to super-resolution videos such as 4K resolution videos at a low bitrate using HDTV video transmission. Herein, HDTV stands for High-definition television, SHVC stands for Scalable High-efficiency Video Coding, and HEVC stands for High-efficiency Video Coding.

In the SHVC encoding technology, in addition to performing inter-screen prediction and in-screen prediction used in HEVC, inter-layer prediction meant for predicting 4K images from among HDTV images is also performed; and the subjective image quality is improved by holding down the volume of data assigned to such image areas which have movement-induced distortion and by assigning a greater volume of data to such in-focus image areas which have less movement. Moreover, temporal-spatial image processing is performed so that the difficult-to-compress noise components are removed in advance from the 4K images. That enables achieving control on the decline in the feel of resolution at a low bit rate. For that reason, even in the case in which the additional bit rate is set to 10 Mbps, it becomes possible to maintain the feel of resolution of the 4K images. In order to distribute videos of 4K resolution, it is necessary to have the bit rate of, for example, about 30 Mbps. However, as a result of implementing the HEVC encoding technology, the additional transmission bandwidth that is required can be reduced to about 10 Mbps that is one-third of 30 Mbps.

In a narrow-bandwidth video transmission system in which SHVC is used, reference images are shared in advance between the transmission side and the reception side. The transmission side transmits encoding data representing only the difference with the reference images. The reception side decodes the received encoding data using the reference images shared in advance. Since the encoding data represents only the difference with the reference images, it becomes possible to reduce the volume of data and to perform video streaming having excellent bandwidth usage efficiency.

DETAILED DESCRIPTION

Figure 1:
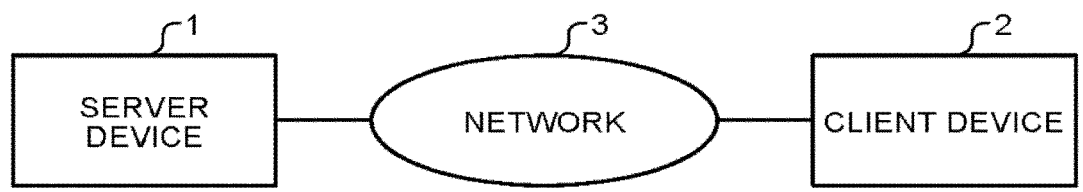
FIG. 1 is a system configuration diagram of a streaming system according to a first embodiment.

According to an embodiment, an encoding device includes a storage controller, a difference generator, and a communication controller. The storage controller is configured to store a base stream in a storage. The base stream serves as basis for encoding and decoding and is shared with a decoding device. The difference generator is configured to generate a difference bit stream that represents difference between an input bit stream that has been input and the base stream. The communication controller is configured to control a communicating unit to transmit the difference bit stream.

Exemplary embodiments of a streaming system are described below in detail with reference to the accompanying drawings.

Overview

The streaming system according to the embodiments is, for example, a system that transmits and receives videos for surveillance purposes. An encoder on the transmission side generates in advance, for each predetermined screen pattern, a base stream of, for example, intra-picture NAL units serving as the basis for encoding and decoding, and stores the base stream. Herein, NAL stands for Network Abstraction Layer. Each generated base stream is also stored in the decoder on the reception side. Thus, the base streams are shared between the encoder side and the decoder side. The timing of storing the base streams in the decoder on the reception side can be at the time of the factory shipment or the initial setup of the decoder on the reception side. Alternatively, the base streams are dynamically updated in an asynchronous or synchronous manner during the actual stream transmission.

In the case of encoding input videos, the encoder makes use of the base streams shared with the decoder side and encodes the input videos; and, based on the encoding state, generates difference bit streams of P picture NAL units, for example. Thus, only the difference bit streams are transmitted to the decoder. That enables achieving reduction in the volume of data to be transmitted. Moreover, the difference bit streams to be transmitted to the decoder can have information included therein to indicate whether or not base streams are used.

The decoder on the receiver side makes use of the base streams shared in advance and the received difference bit streams, and reconfigures bit streams equivalent to (having the identical image quality and the identical resolution to) the bit streams that were originally supposed to be generated by the encoder. In other words, the decoder reconfigures the bit streams that are reproduced using the base streams shared in advance and the received difference bit streams and that represent the state in which the screens corresponding to the difference bit streams are encoded. Then, the decoder decodes the reconfigured streams and displays them. Hence, during screen transmission, it becomes possible to perform video streaming having excellent bandwidth usage efficiency. Moreover, it becomes possible to make a dedicated decoder redundant. Furthermore, the amount of processing for reconfiguration can be reduced as compared to the transcode too. Thus, the receiving device (decoder) can be implemented using a general-purpose decoder chip and an inexpensive central processing unit (CPU), thereby enabling achieving reduction in the cost of the streaming system.

First Embodiment

FIG. 1 is a system configuration diagram of a streaming system according to a first embodiment. As illustrated in FIG. 1, the streaming system according to the first embodiment includes a server device 1 and a client device 2. The server device 1 and the client device 2 are connected to each other via a network 3 such as the Internet. The server device 1 performs scalable expansion of predetermined video streams using the SHVC encoding technology; lowers the bitrate of high-resolution video signals, such as 4K video signals or 8K video signals, while maintaining the feel of high resolution thereof; and distributes the video signals via the network 3. Herein, SHVC stands for Scalable High-efficiency Video Coding. The client device 2 represents a general-purpose HEVC decoder that, as described later, decodes the video signals that have been subjected to SHVC encoding and reproduces the decoded video signals without any special configuration. The decoded video signals are either displayed on a monitor device or recorded in a recorder device. Herein, HEVC stands for High-Efficiency Video Coding.

Figure 2:
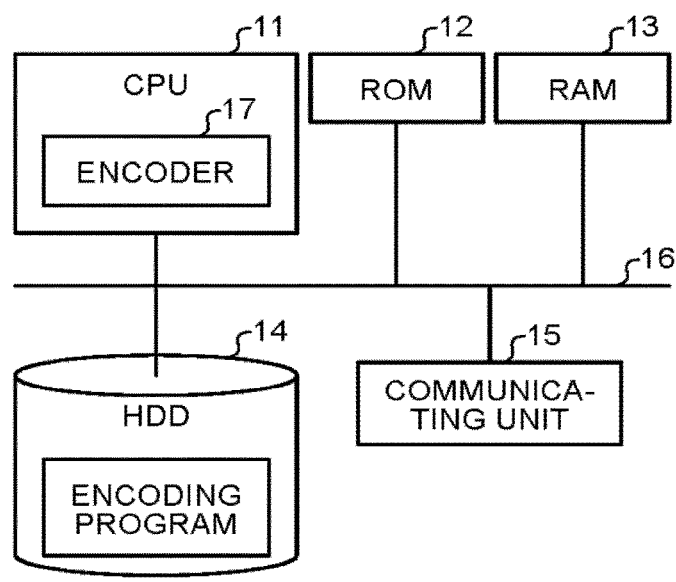
FIG. 2 is a hardware configuration diagram of a server device that is installed in the streaming system according to the first embodiment.

FIG. 2 is a hardware configuration diagram of the server device 1. As illustrated in FIG. 2, the server device 1 includes a CPU 11, a ROM 12, a RAM 13, a hard disk drive (HDD) 14, and a communicating unit 15. The CPU 11 to the communicating unit 15 are connected to each other via a bus line 16. Herein, CPU stands for Central Processing Unit, ROM stands for Read Only Memory, and RAM stands for Random Access Memory.

The HDD 14 is used to store an encoding program for encoding video streams. The CPU 11 performs operations according to the encoding program and functions as an encoder 17 for performing SHVC encoding of video streams and distributing encoded video streams. Meanwhile, the encoding program can alternatively be stored in some other storage such as the ROM 12 or the RAM 13.

Figure 3:
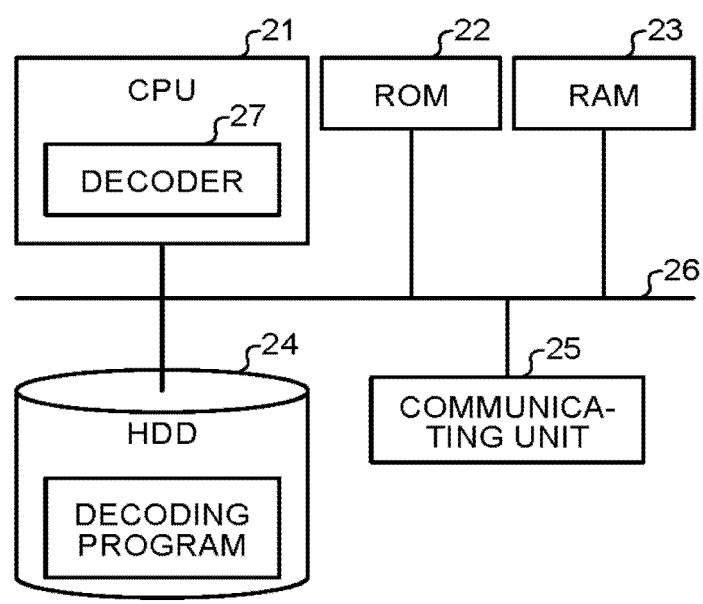
FIG. 3 is a hardware configuration diagram of a client device that is installed in the streaming system according to the first embodiment.

FIG. 3 is a hardware configuration diagram of the client device 2. As illustrated in FIG. 3, the client device 2 includes a CPU 21, a ROM 22, a RAM 23, an HDD 24, and a communicating unit 25. The CPU 21 to the communicating unit 25 are connected to each other via a bus line 26.

The HDD 24 is used to store a decoding program for decoding the SHVC-encoded video streams that are transmitted from the server device 1. The CPU 21 performs operations according to the decoding program and functions as a decoder 27 for decoding the video streams received from the server device 1. Meanwhile, the decoding program can alternatively be stored in some other storage such as the ROM 22 and the RAM 23.

The following explanation is given for an example in which the encoder 17 and the decoder 27 are implemented using software. However, alternatively, either one or both of the encoder 17 and the decoder 27 can be implemented using hardware such as an integrated circuit.

The encoding program and the decoding program can be recorded as installable or executable files in a computer-readable recording medium, which may be provided as a computer program product, such as a compact disk read only memory (CD-ROM) or a flexible disk (FD). Alternatively, the encoding program and the decoding program can be recorded in a computer-readable recording medium such as a CD-R, a DVD, a Blu-ray disc (registered trademark), or a semiconductor memory. Herein, DVD stands for Digital Versatile Disk. Still alternatively, the encoding program and the decoding program can be installed via a network such as the Internet. Still alternatively, the encoding program and the decoding program can be stored in advance in the ROM of a device.

Figure 4:
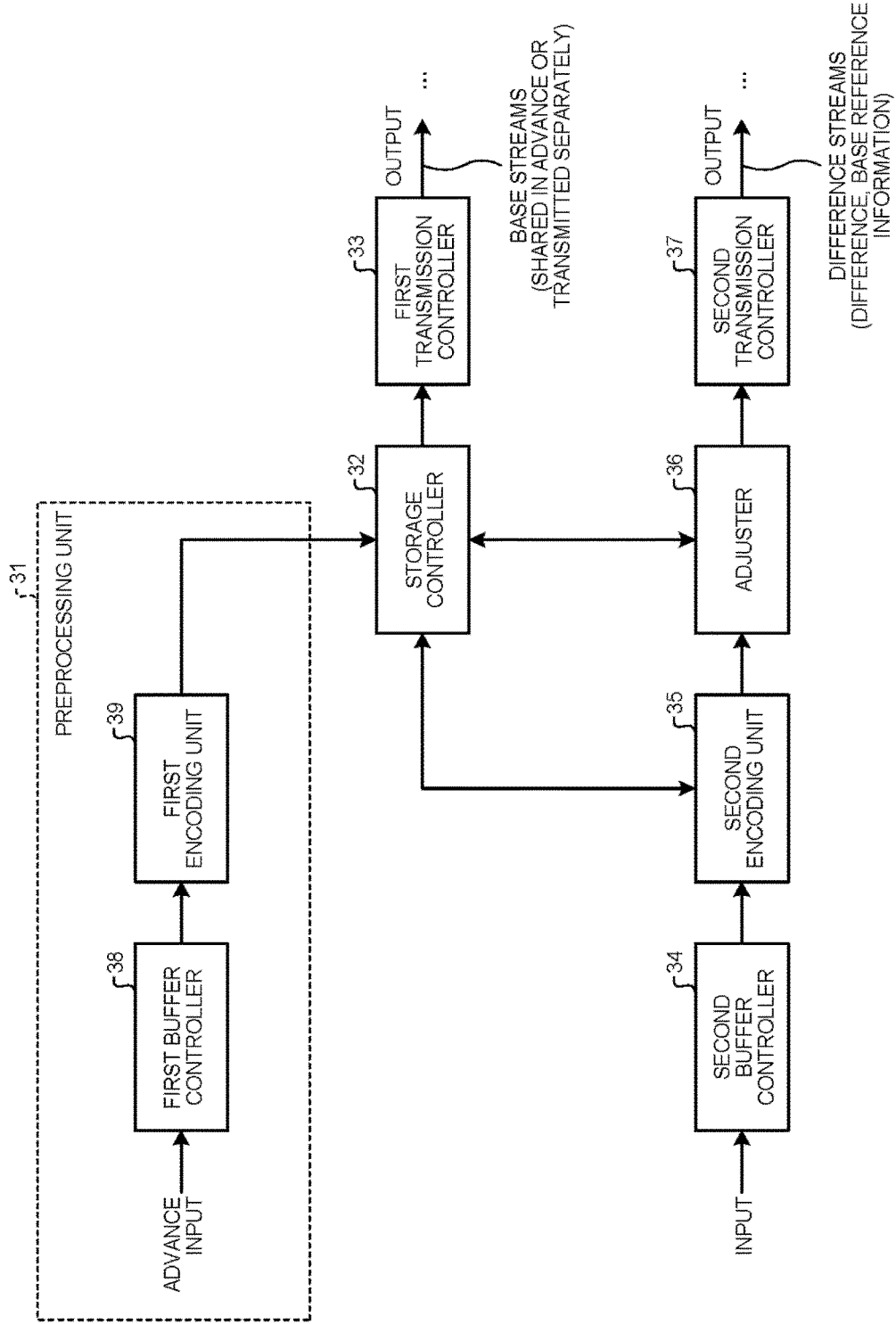
FIG. 4 is a functional block diagram of an encoder in the server device.

FIG. 4 is a functional block diagram of the encoder 17 in the server device 1. The encoder 17 is an example of an encoding device. As illustrated in FIG. 3, the encoder 17 includes a preprocessing unit 31, a storage controller 32, a first transmission controller 33, a second buffer controller 34, a second encoding unit 35, an adjuster 36, and a second transmission controller 37. The preprocessing unit 31 further includes a first buffer controller 38 and a first encoding unit 39. Meanwhile, as described above, some or all of the constituent elements from the preprocessing unit 31 to the second transmission controller 37 can be implemented using hardware.

The preprocessing unit 31 is a processing unit that, for example, at the time of the factory shipment or the initial setup of the client device 2 on the reception side, generates in advance the base streams mentioned above and stores them in a decoder. For that reason, at the time of actual stream transmission, in the case of dynamically updating the base streams on the decoder side in an asynchronous or synchronous manner, the preprocessing unit 31 becomes redundant. Meanwhile, in FIG. 4, although the preprocessing unit 31 is illustrated as an independent processing unit, it can alternatively be omitted by substituting the second buffer controller 34 for the first buffer controller 38 and by substituting the second encoding unit 35 with the first encoding unit 39.

The storage controller 32 performs control to store the base stream, which is generated by the preprocessing unit 31 and which is shared with the client device 2 (the decoder 27), in a storage such as the RAM 13. The first transmission controller 33 controls the communicating unit 15 to transmit the base stream, which is stored in the RAM 13, to the client device 2, so that the base stream gets shared with the decoder 27.

The second buffer controller 34 buffers the input video streams (input bit streams) in a storage such as the RAM 13. The second encoding unit 35, which is an example of a difference generator, generates difference bit streams representing the difference between the base streams stored in the RAM 13 and the buffered video streams. As a result, bit streams subjected to scalable expansion and having a low bit rate (a bit stream subjected to SHVC encoding) are generated.

The adjuster 36 adjusts the difference bit streams by adding thereto identification information or relevant information of the base streams serving as the reference. The second transmission controller 37, which is an example of a communication controller, controls the communicating unit 15 to transmit the adjusted difference bit streams to the client device 2.

Figure 5:
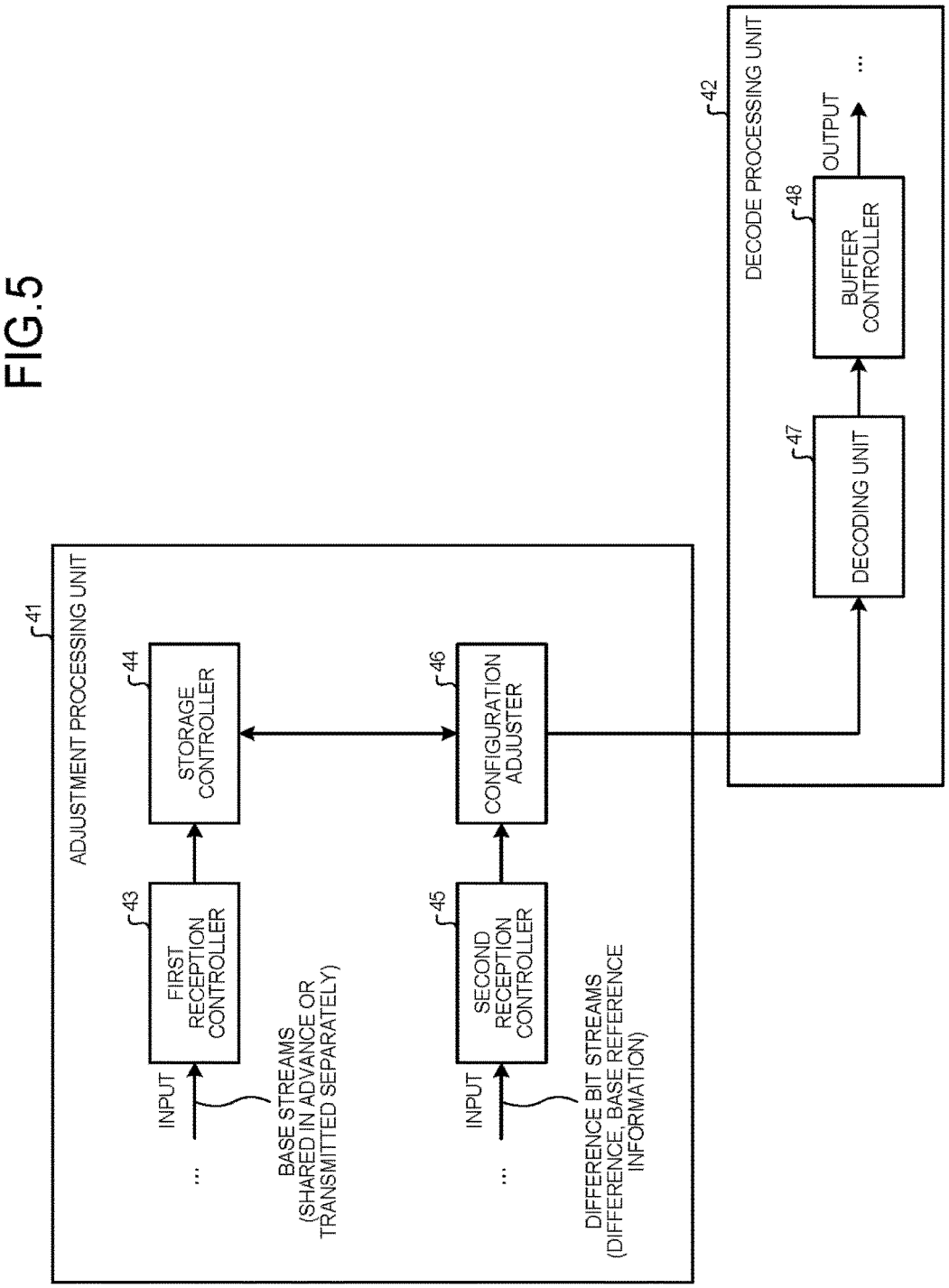
FIG. 5 is a functional block diagram of a decoder in the client device.

FIG. 5 is a functional block diagram of the decoder 27 in the client device 2. The decoder 27 is an example of a decoder device. As illustrated in FIG. 5, the decoder 27 includes an adjustment processing unit 41 and a decode processing unit 42. The adjustment processing unit 41 further includes a first reception controller 43, a storage controller 44, a second reception controller 45, and a configuration adjuster 46. The decode processing unit 42 further includes a decoding unit 47 and a buffer controller 48. As described above, some or all of the constituent elements from the first reception controller 43 to the buffer controller 48 can be configured using hardware.

The first reception controller 43 controls the communicating unit 25 to receive, from the server device 1, the base streams that are generated in advance as described above or are updated in a dynamic manner. The storage controller 44 performs control to store the received base streams in a storage such as the RAM 23. The second reception controller 45 controls the communicating unit 25 to receive difference bit streams from the server device 1. The configuration adjuster 46 makes use of the base streams shared in advance and the received difference streams and reconfigures bit streams equivalent to (having the identical image quality and the identical resolution to) the bit streams that were originally supposed to be generated by the encoder 17.

The decoder performs normal HEVC decoding with respect to the reconfigured bit streams. The buffer controller 48 buffers the decoded bit streams in the RAM 23 and sequentially reads them for output to a monitor device or a recording device.

Figure 6:
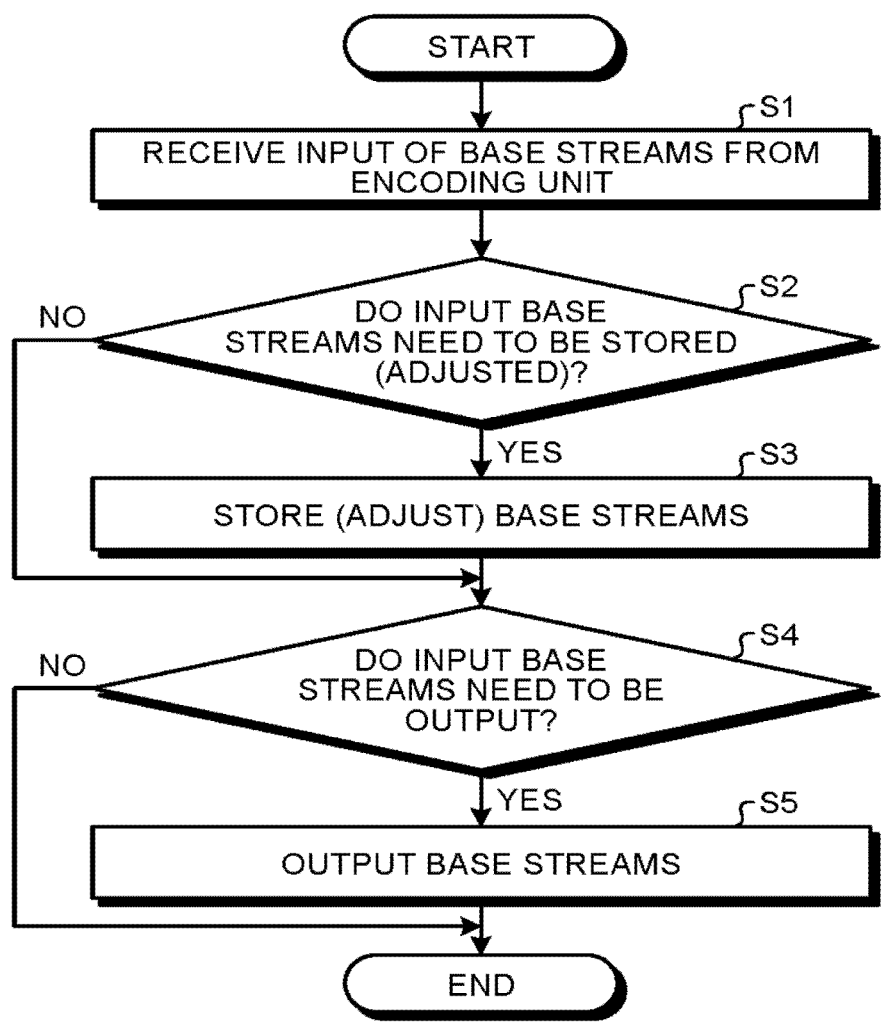
FIG. 6 is a flowchart for explaining a flow of operations performed for generating base streams to be shared with the client device.

Explained with reference to a flowchart illustrated in FIG. 6 is a flow of operations performed for generating base streams to be shared with the client device 2. For example, at the time of factory shipment or the initial setup of the client device 2 on the reception side or at the timing of performing preprocessing during actual stream transmission, the first buffer controller 38 of the preprocessing unit 31 buffers, in the RAM 13, advance-input pictures (i.e., bit streams that have been input in advance).

Examples of the advance-input pictures include captured images, pictures obtained via camera input, and pictures subjected to predetermined processing. Moreover, it is desirable that, at the time of generating difference bit streams, the advance-input pictures have the image quality usable as reference pictures and have a high degree of similarity with the pictures for which the difference is generated.

The first encoding unit 39 reads, from the RAM 13, the buffered advance-input pictures and generates SHVC base streams. The base streams can be of a single type or of a plurality of types. Moreover, the base streams can be the encoded bit streams in entirety or can be some portion of the encoded bit streams. Examples of partial base streams include the I-pictures of elementary streams.

At Step S1 illustrated in the flowchart in FIG. 6, the storage controller 32 obtains the base streams. At Step S2, the storage controller 32 determines whether or not some storage is required for the purpose of, for example, performing an adjustment operation for adding identification information or relevant information to the base streams. If some storage is required (Yes at Step S2), then the system control proceeds to Step S3. On the other hand, if no storage is required (No at Step S2), then the system control proceeds to Step S4.

At Step S3, the adjuster 36 performs the adjustment operation for adding identification information or relevant information to the base streams. Moreover, at Step S3, the storage controller 32 temporarily stores the post-adjustment base streams in the RAM 23.

Then, at Step S4, the first transmission controller 33 determines whether or not it is necessary to output (transmit) the base streams to the client device 2. If the base streams need to be output (Yes at Step S4), then the first transmission controller 33 controls the communicating unit 15 to transmit the base streams to the client device 2 at Step S5. On the other hand, if the base streams need not be output (No at Step S4), then the first transmission controller 33 does not transmit the base streams, and it marks the end of the operations illustrated in the flowchart in FIG. 6.

The timing at which the first transmission controller 33 transmits the base streams to the client device 2 can be, for example, the timing at which the storage controller 32 notifies that a new base stream is stored. Alternatively, the timing at which the first transmission controller 33 transmits the base streams to the client device 2 can be the timing at which a base stream output instruction is issued by the user or the system. Still alternatively, the timing at which the first transmission controller 33 transmits the base streams to the client device 2 can be a predetermined timing or the timing at which the client device 2 issues a transmission request. Meanwhile, the base streams can be transmitted at an arbitrary transmission speed. That is, the base streams can be transmitted at the transmission speed having a low bitrate according to the communication line of the client device 2 or can be transmitted at the transmission speed having a high bitrate for shortening the output time.

Figure 7:
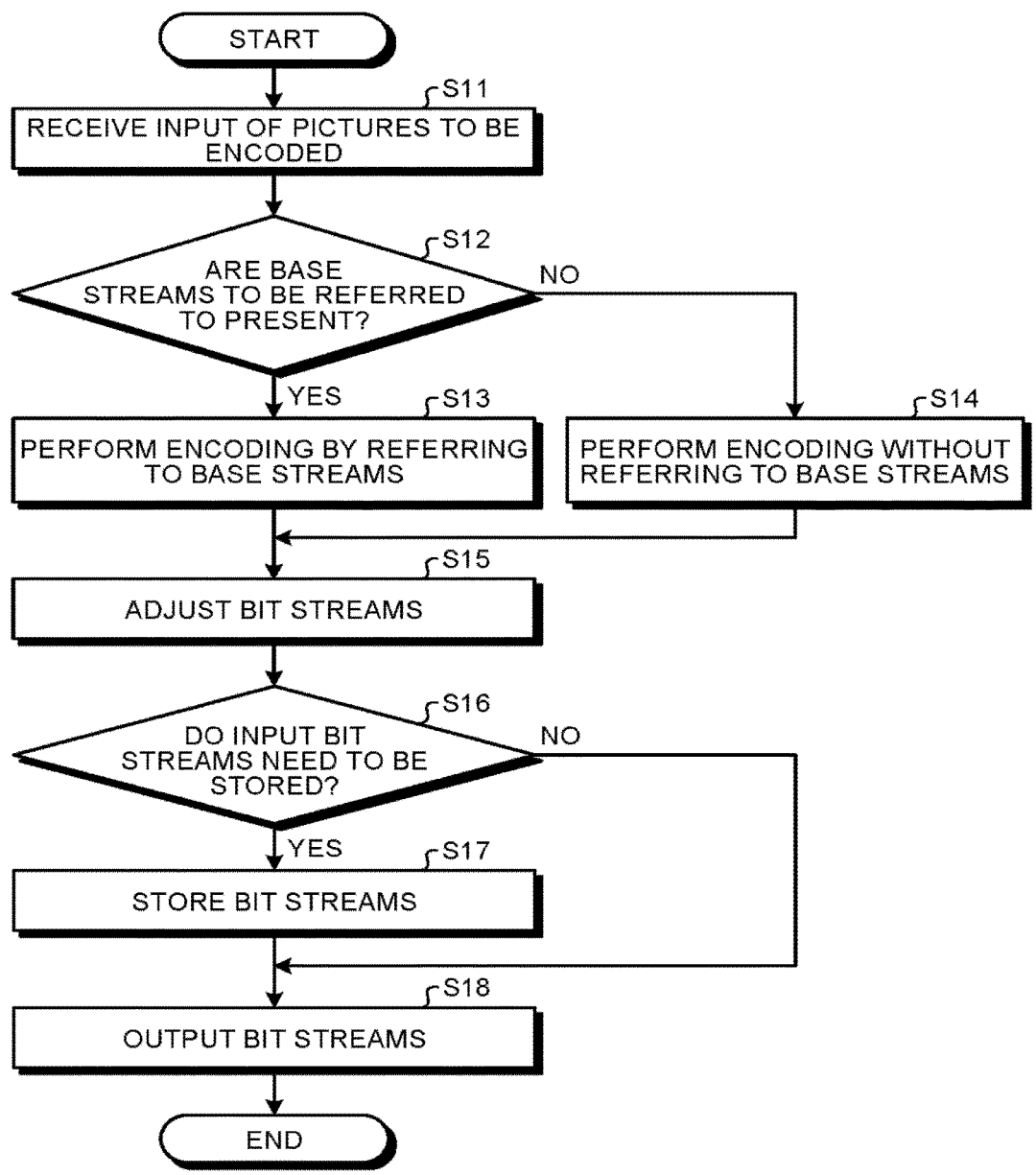
FIG. 7 is a flowchart for explaining a flow of operations performed for generating difference bit streams based on the base streams, and transmitting the difference bit streams to the client device.

Explained below with reference to a flowchart illustrated in FIG. 7 is a flow of operations performed for generating difference bit streams based on the base streams, and transmitting the difference bit streams to the client device 2. At Step S11, the second buffer controller 34 illustrated in FIG. 4 obtains the pictures to be encoded and buffers the pictures in the RAM 13. At Step S12, the second encoding unit 35 determines, using the storage controller 32, whether or not the base streams to be referred to while encoding the input pictures are stored in the RAM 13.

If the base streams to be referred to are not stored in the RAM 13 (No at Step S12); then, at Step S14, the second encoding unit 35 performs SHVC encoding with respect to the input pictures without referring to the base streams, and the system control proceeds to Step S15. On the other hand, if the base streams to be referred to are stored in the RAM 13 (Yes at Step S12); then, at Step S13, the second encoding unit 35 refers to the base streams and performs SHVC encoding for generating difference bit streams that represent the difference with the input pictures. Then, the system control proceeds to Step S15.

At Step S15, the adjuster 36 performs an adjustment operation for adding identification information or relevant information of the reference base streams to the difference bit streams generated as a result of SHVC encoding. At Step S16, the storage controller 32 determines whether or not the bit streams generated as a result of SHVC encoding are to be stored in the RAM 13. If the bit streams are to be stored (Yes at Step S16); then, at Step S17, the storage controller 32 stores, in the RAM 13, the bit streams generated as a result of SHVC encoding. At that time, the storage controller 32 stores the newly-generated bit streams in the RAM 13 or updates the bit streams stored in the RAM 13 with the new bit streams. Alternatively, the storage controller 32 stores only the difference between the bit streams stored in the RAM 13 and the new bit streams. Meanwhile, if the bit streams need not be stored (No at Step S16); then the system control proceeds to Step S18.

At Step S18, the second transmission controller 37 controls the communicating unit 15 to transmit the difference bit streams to the client device 2, and it marks the end of the operations illustrated in the flowchart in FIG. 7. In the streaming system according to the first embodiment, the base streams are initially transmitted to the client device 2, and subsequently only the difference bit streams representing the difference with the base streams are transmitted to the client device 2. As a result, it becomes possible to lower the bitrate, thereby enabling effective usage of the transmission bandwidth.

Figure 8:
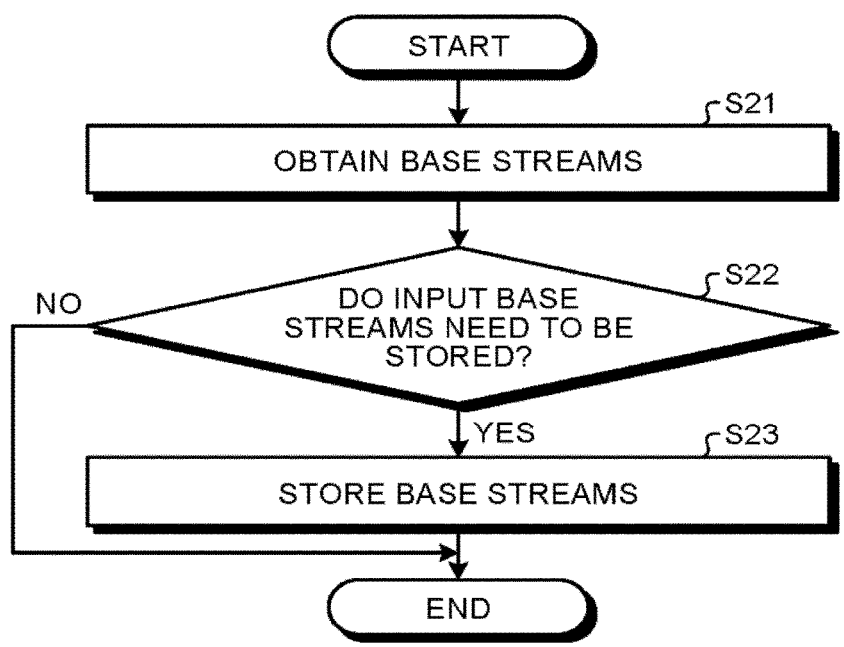
FIG. 8 is a flowchart for explaining a flow of operations performed for storing the base streams, which are transmitted from the server device, in the client device.

Explained below with reference to a flowchart illustrated in FIG. 8 is a flow of operations performed for storing the base streams, which are transmitted from the server device 1, in the client device 2. At Step S21, the first reception controller 43 illustrated in FIG. 5 controls the communicating unit 25 to obtain the base streams transmitted from the server device 1. At Step S22, the storage controller 44 determines whether or not the obtained base streams need to be stored.

More particularly, when a base stream output instruction is issued by the user or the system or when the predetermined timing has arrived, the storage controller 44 stores the obtained base streams in a storage such as the RAM 23. Alternatively, when the server device 1 has instructed to store the base streams or when the configuration adjuster 46 has instructed to store the base streams, the storage controller 44 stores the obtained base streams in the RAM 23. Meanwhile, the base streams can be input at an arbitrary input speed. That is, the base streams can be input at the input speed having a low bitrate according to the communication line of the server device 1 or can be input at the input speed having a high bitrate for shortening the input time.

At Step S22, if it is determined that the base streams need to be stored, then, at Step S23, the storage controller 44 performs control to store the obtained base streams in the RAM 23. As a result, the base streams get shared between the server device 1 and the client device 2. On the other hand, at Step S22, if it is determined that the base streams need not be stored, then the storage controller 44 ends the operations illustrated in the flowchart in FIG. 8.

Figure 9:
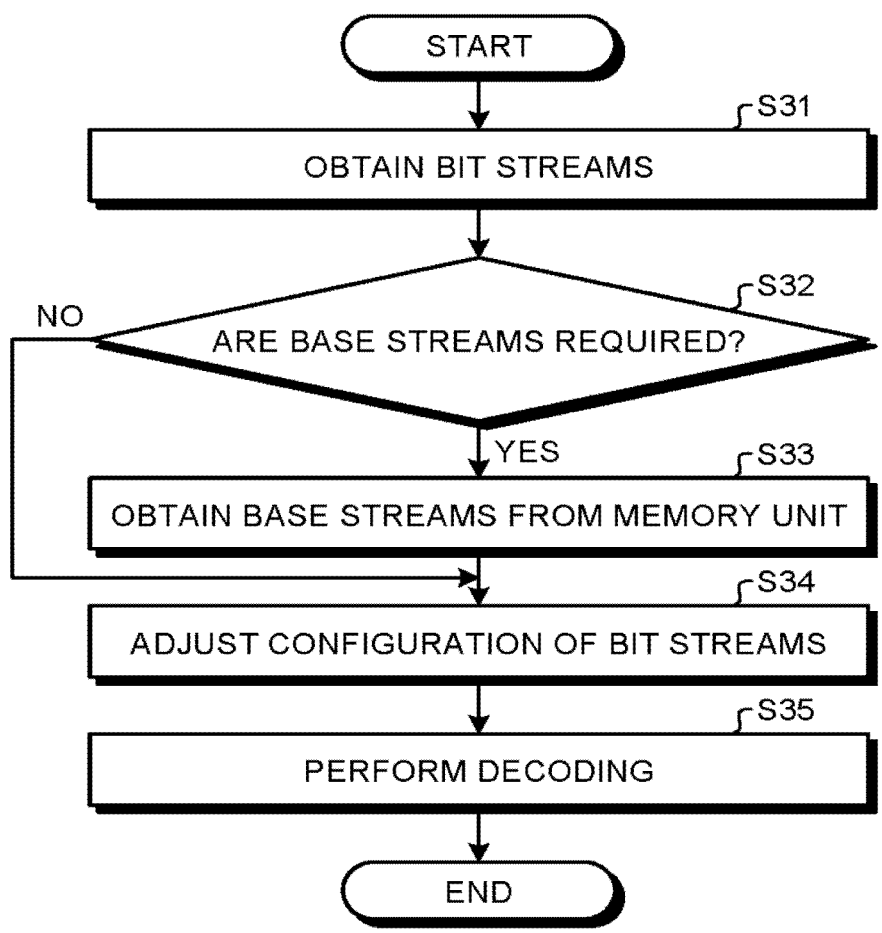
FIG. 9 is a flowchart for explaining a flow of operations for decoding the bit streams that have been transmitted from the server device.

Explained below with reference to a flowchart in FIG. 9 is a flow of operations for decoding the bit streams that have been transmitted from the server device 1. At Step S31, the second reception controller 45 controls the communicating unit 25 to obtain the bit streams transmitted from the server device 1. At Step S32, the configuration adjuster 46 determines whether or not the base streams are required for decoding bit streams.

If the base streams are required (Yes at Step S32), then, at Step S33, the configuration adjuster 46 obtains the base streams stored in advance in the RAM 23, and the system control proceeds to Step S43. On the other hand, if the base streams are not required (No at Step S32), then the system control proceeds to Step S34.

At Step S34, the configuration adjuster 46 makes use of the base streams shared in advance and the subsequent difference bit streams that are received, and reconfigures bit streams equivalent to (having the identical image quality and the identical resolution to) the bit streams that were originally supposed to be generated by the encoder 17 of the server device 1. In other words, the configuration adjuster 46 reconfigures the bit streams that are reproduced using the base streams shared in advance and the received difference bit streams and that represent the state in which the screens corresponding to the difference bit streams are encoded. At Step S35, the decoding unit 47 performs normal HEVC decoding and decodes the reconfigured bit streams. Then, the buffer controller temporarily stores the decoded bit streams in the RAM 23 and sequentially reads them for output to a monitor device or a recording device.

In the streaming system according to the first embodiment, during the transmission of bit streams, it becomes possible to perform streaming having excellent bandwidth usage efficiency. Moreover, without having to use a dedicated decoder compatible to SHVC, a normal HEVC decoder can be used to decode the bit streams that have been subjected to SHVC encoding. Furthermore, the amount of processing for reconfiguration can be reduced as compared to the transcode too. Thus, the client device 2 can be implemented using a general-purpose decoder chip and an inexpensive CPU, thereby enabling achieving reduction in the cost of the streaming system.

Second Embodiment

Given below is the explanation of a streaming system according to a second embodiment. In contrast to the streaming system according to the first embodiment in which the bit streams of dynamic picture images are transmitted, the streaming system according to the second embodiment transmits the bit streams of still images (pictures). Herein, the second embodiment differs from the first embodiment only in that regard. Hence, the following explanation is given only for that difference, and the repetition of other explanation is avoided.

Figure 10:
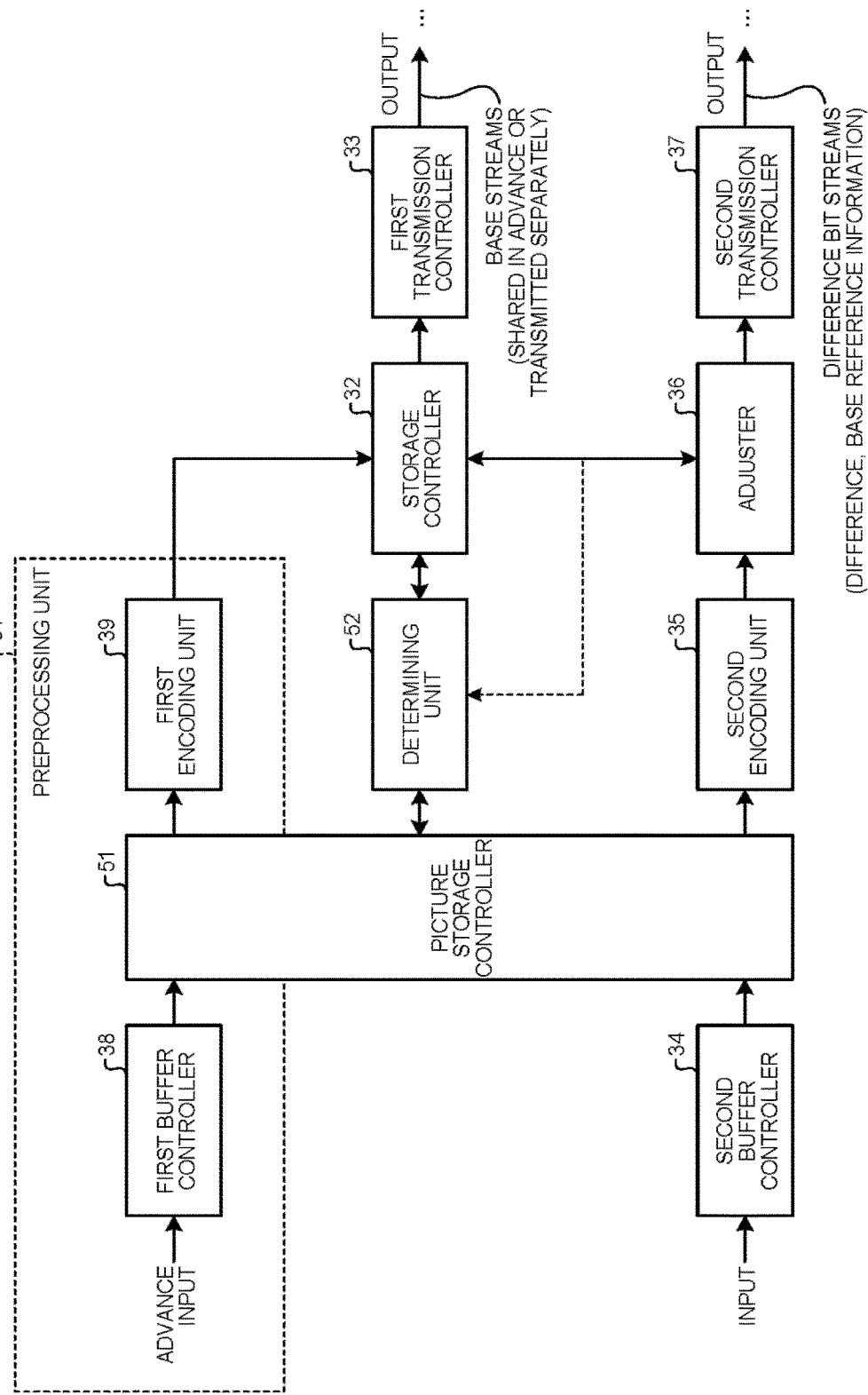
FIG. 10 is a functional block diagram of the encoder in a streaming system according to a second embodiment.

FIG. 10 is a functional block diagram of the encoder 17 in the streaming system according to the second embodiment. In FIG. 10, the constituent elements performing identical operations to the constituent elements illustrated in FIG. 4 are referred to by the same reference numerals. As illustrated in FIG. 10, the encoder 17 in the streaming system according to the second embodiment includes, in addition to the functions illustrated in FIG. 4, a picture storage controller 51 that performs control to store the pictures, which have been buffered by the first buffer controller 38 and the second buffer controller 34, in the RAM 13; as well as includes a determining unit 52 that determines (selects) the pictures to be encoded from among the pictures stored in the RAM 13.

Figure 11:
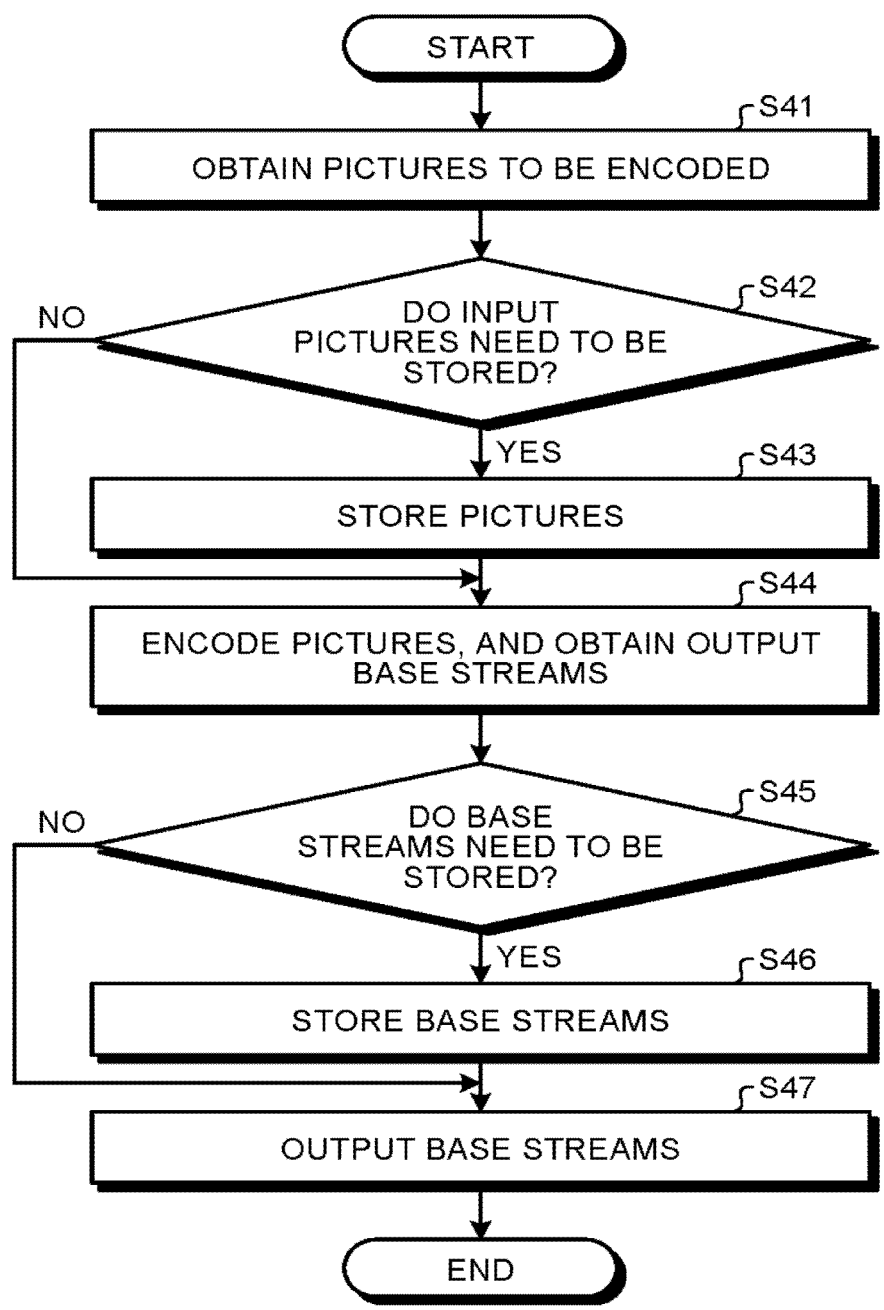
FIG. 11 is a flowchart for explaining a flow of operations for generating the base streams to be shared with the client device in the streaming system according to the second embodiment.

Explained below with reference to a flowchart illustrated in FIG. 11 is a flow of operations for generating the base streams to be shared with the client device 2. At Step S41, for example, at the time of factory shipment or the initial setup of the client device 2 on the reception side or at the timing of performing preprocessing during actual stream transmission, the first buffer controller 38 of the preprocessing unit 31 illustrated in FIG. 10 buffers, in the RAM 13, pictures that have been input in advance (advance-input pictures).

Examples of the advance-input pictures include captured images, pictures obtained via camera input, and pictures subjected to predetermined processing. Moreover, it is desirable that, at the time of generating difference bit streams, the advance-input pictures have the image quality usable as reference pictures and have a high degree of similarity with the pictures for which the difference is generated.

At Step S42, the picture storage controller 51 operates in tandem with the determining unit 52 and determines whether or not the advance-input pictures need to be stored. If it is determined that the advance-input pictures need to be stored (Yes at Step S41), then, at Step S43, the picture storage controller 51 performs control to store the advance-input pictures in the RAM 23, and the system control proceeds to Step S44. On the other hand, if the advance-input pictures need not be stored (No at Step S41), then the system control proceeds to Step S44.

At Step S44, the first encoding unit 39 reads the advance-input pictures from the RAM 13 and generates SHVC base streams. The base streams can be of a single type or of a plurality of types. Moreover, the base streams can be the encoded bit streams in entirety or can be some portion of the encoded bit streams. Examples of partial base streams include the I-pictures of elementary streams.

Subsequently, at Step S45, the storage controller 32 determines whether or not the base streams need to be stored for the purpose of, for example, performing an adjustment operation for adding identification information or relevant information. If the base streams need to be stored (Yes at Step S45), then the system control proceeds to Step S46. However, if the base streams need not be stored (No at Step S45), then the system control proceeds to Step S47.

At Step S46, the storage controller 32 performs control to store the base streams in the RAM 13; the adjuster 36 performs, as may be necessary, an adjustment operation for adding identification information or relevant information to the base streams. Then, at Step S47, the first transmission controller 33 controls the communicating unit 25 to transmit the base streams to the client device 2. It marks the end of the operations illustrated in the flowchart in FIG. 6. As a result, the base streams get shared between the server device 1 and the client device 2.

The timing at which the first transmission controller 33 transmits the base streams to the client device 2 can be, for example, the timing at which the storage controller 32 notifies that a new base stream is stored. Alternatively, the timing at which the first transmission controller 33 transmits the base streams to the client device 2 can be the timing at which a base stream output instruction is issued by the user or the system. Still alternatively, the timing at which the first transmission controller 33 transmits the base streams to the client device 2 can be a predetermined timing or the timing at which the client device 2 issues a transmission request. Meanwhile, the base streams can be transmitted at an arbitrary transmission speed. That is, the base streams can be transmitted at the transmission speed having a low bitrate according to the communication line of the client device 2 or can be transmitted at the transmission speed having a high bitrate for shortening the output time.

Figure 12:
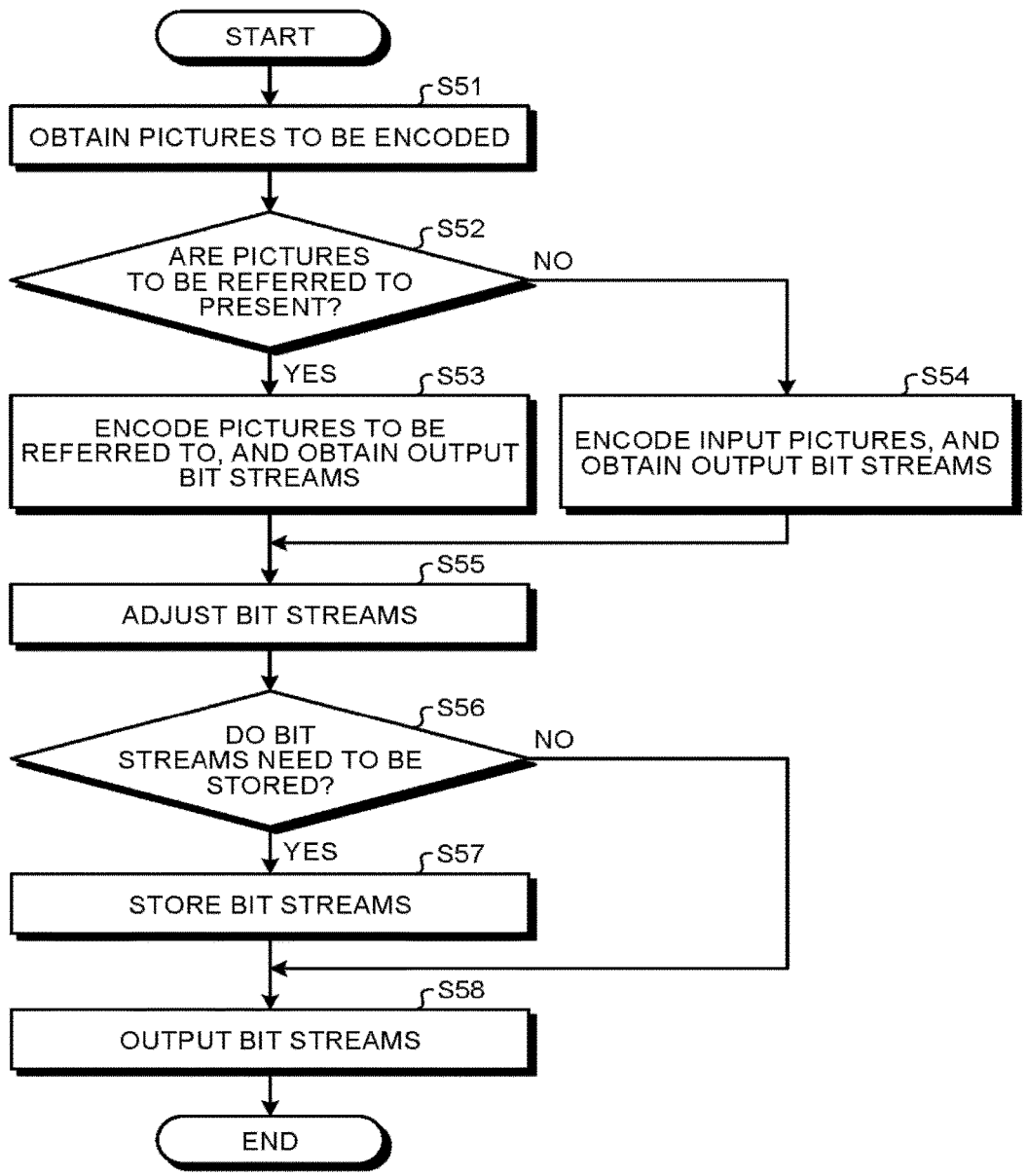
FIG. 12 is a flowchart for explaining a flow of operations for generating difference bit streams based on base streams, and transmitting the difference bit streams to the client device in the streaming system according to the second embodiment.

Explained below with reference to a flowchart illustrated in FIG. 12 is a flow of operations for generating difference bit streams based on base streams, and transmitting the difference bit streams to the client device 2. At Step S51, the second buffer controller 34 illustrated in FIG. 10 obtains the input pictures to be encoded and buffers the input pictures in the RAM 13. At Step S52, the picture storage controller 51 operates in tandem with the determining unit 52 and determines whether or not the pictures (the base streams) to be referred to in regard with the input pictures are present (are stored in the RAM 13).

If the pictures to be referred to are present (Yes at Step S52), then the second encoding unit 35 performs SHVC encoding of the pictures that should be referred to instead of performing SHVC encoding of the input pictures, and generates bit streams. However, if the pictures to be referred to are not present (No at Step S52), then the second encoding unit 35 performs SHVC encoding of the input pictures and generates bit streams. Meanwhile, the picture storage controller 51 can operate in tandem with the determining unit 52 to determine the pictures to be encoded, determine whether or not the input pictures need to be stored, and, if it is determined that the input pictures need to be stored, store the input picture in the RAM 13.

Subsequently, at Step S55, the adjuster 36 performs an adjustment operation for adding identification information or relevant information of the reference base streams to the bit streams generated as a result of SHVC encoding. At Step S56, the storage controller 32 determines whether or not to store the bit streams, which are generated as a result of SHVC encoding, in the RAM 13. If the bit streams need to be stored (Yes at Step S56), then, at Step S57, the storage controller 32 stores the bit streams generated as a result of SHVC encoding. At that time, the storage controller 32 stores the newly-generated bit streams in the RAM 13 or updates the bit streams stored in the RAM 13 with the new bit streams. Alternatively, the storage controller 32 stores only the difference between the bit streams stored in the RAM 13 and the new bit streams. Meanwhile, if the bit streams need not be stored (No at Step S56), then the system control proceeds to Step S58.

At Step S58, the second transmission controller 37 controls the communicating unit 15 to transmit the bit streams to the client device 2. It marks the end of the operations illustrated in the flowchart in FIG. 12. In the streaming system according to the second embodiment too, the base streams representing the reference pictures are initially transmitted to the client device 2, and subsequently only the difference bit streams representing the difference with the base streams are transmitted to the client device 2. As a result, it becomes possible to lower the bitrate, thereby enabling effective usage of the transmission bandwidth. Thus, it is possible to achieve identical effects as the effects achieved in the first embodiment.

Moreover, in the second embodiment too, the decoder 27 of the client device 2 makes use of the base streams shared in advance and the received input pictures and reconfigures bit streams equivalent to (having the identical image quality and the identical resolution to) the bit streams that were originally supposed to be generated by the encoder 17. Then, the decoder 27 reproduces the reconfigured streams and displays them.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An encoding device comprising:
a preprocessing unit configured to generate a base stream in advance, the base stream serving as a basis for encoding and decoding and being shared with a decoding device, the base stream being a bit stream;
a storage controller configured to store in storage the base stream that is generated in advance;
a difference generator configured to generate a difference bit stream that represents a difference between an input bit stream that has been input and the base stream; and
a communication controller configured to control a communicating unit to transmit the difference bit stream.

2. The device according to claim 1, further comprising an adjuster configured to add identification information of the base stream to the difference bit stream.

3. The device according to claim 1, further comprising a preprocessing unit configured to generate the base stream by encoding an advance-input bit stream that is input in advance.

4. A decoding device comprising:
a storage controller configured to store a base stream in storage, the base stream serving as a basis for encoding and decoding, the base stream being generated in advance and being shared with an encoding device, the base stream being a bit stream;
an adjustment processing unit configured to generate the bit stream in which a screen corresponding to a difference bit stream that represents difference with the base stream is encoded, the screen being reproduced using the base stream and the difference bit stream; and
a decoding unit configured to, with respect to the bit stream generated by the adjustment processing unit, perform decoding corresponding to encoding performed with respect to the bit stream.

5. The device according to claim 4, further comprising:
a first reception controller configured to control a communicating unit to receive the base stream transmitted from the encoding device; and
a second reception controller configured to control the communicating unit to receive the difference bit stream transmitted from the encoding device.

6. A computer program product comprising a computer-readable medium containing an encoding program, wherein the program, when executed by a computer, causes the computer to execute:
generating a base stream in advance, the base stream serving as a basis for encoding and decoding and being shared with a decoding device, the base stream being a bit stream;
storing in storage, the base stream that is generated in advance;
generating a difference bit stream that represents difference between an input bit stream that has been input and the base stream; and
controlling a communicating unit to transmit the difference bit stream.

7. A computer program product comprising a computer-readable medium containing a decoding program, wherein the program, when executed by a computer, causes the computer to execute:
storing a base stream in a storage, the base stream serving as a basis for encoding and decoding, the base stream being generated in advance and being shared with an encoding device, the base stream being a bit stream;
generating the bit stream in which a screen corresponding to a difference bit stream that represents difference with the base stream is encoded, the screen being reproduced using the base stream and the difference bit stream; and
performing, with respect to the bit stream generated, decoding corresponding to encoding performed with respect to the bit stream.

8. A streaming system comprising an encoding device and a decoding device, wherein
the encoding device comprises:
a preprocessing unit configured to generate a base stream in advance, the base stream serving as a basis for encoding and decoding and being shared with the decoding device, the base stream being a bit stream;
a storage controller configured to store in storage, the base stream that is generated in advance;
a difference generator configured to generate a difference bit stream that represents a difference between an input bit stream that has been input and the base stream; and
a communication controller configured to control a communicating unit to transmit the difference bit stream, and
the decoding device comprises:
a storage controller configured to store in storage the base stream serving as the basis for encoding and decoding, the base stream being generated in advance and being shared with the encoding device;
an adjust lent processing unit configured to generate the bit stream in which a screen corresponding to a difference bit stream that represents a difference with the base stream is encoded, the screen being reproduced using the base stream and the difference bit stream; and
a decoding unit configured to, with respect to the bit stream generated by the adjustment processing unit, perform decoding corresponding to encoding performed with respect to the bit stream.

* * * * *